Feb. 23, 1932. A. C. FISCHER 1,846,325
APPARATUS AND METHOD FOR MAKING COMPOSITION STRIPS
Original Filed Feb. 19, 1930
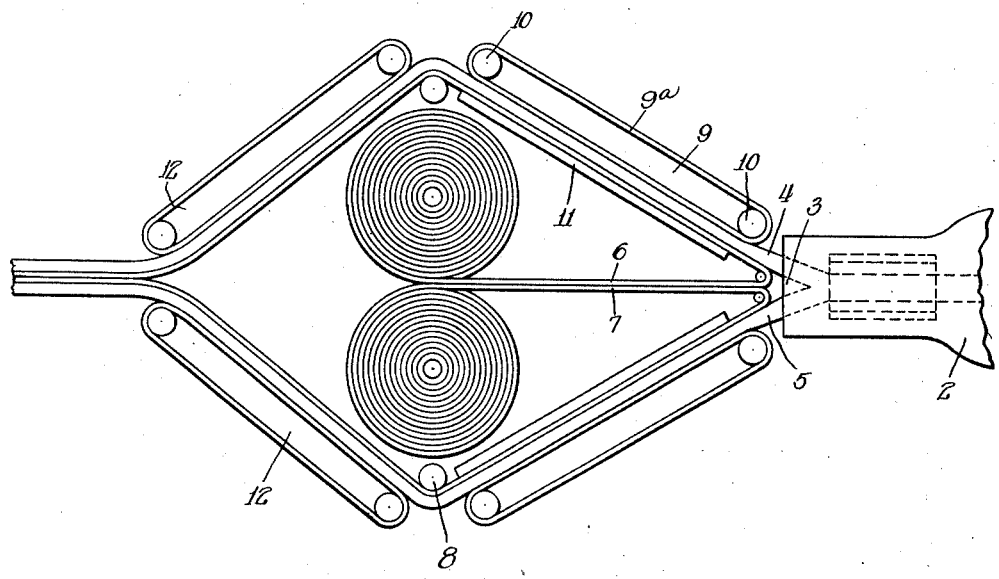
Inventor:—
Albert C. Fischer
By Albert F. Robinson
Atty.

Patented Feb. 23, 1932

1,846,325

UNITED STATES PATENT OFFICE

ALBERT C. FISCHER, OF CHICAGO, ILLINOIS

APPARATUS AND METHOD FOR MAKING COMPOSITION STRIPS

Application filed February 19, 1930, Serial No. 429,559. Renewed May 13, 1931.

This invention relates to the fabrication of composition constructional strips, and particularly pertains to a laminated structure including a flexible reenforcing foundation layer and a surface covering or coverings of elastic and compressible material.

One of the objects of the invention is to fabricate in a continuous layer operation a composition strip composed of a plurality of layers of compressible and elastic material, such as rubber or bituminous material, fed from an extrusion machine in contact with a reenforcing foundation layer, and compressed into a composite laminated structure. The compressible and elastic material is extruded in a warm plastic condition, thereby securely bonding with the foundation sheet which may advantageously be a waterproof sheet, such as saturated felt.

With the foregoing object in view and others to be mentioned hereafter, the invention consists in the novel and improved construction and arrangement of parts as described and claimed, and as illustrated in the accompanying drawing.

In the drawing the single figure is a view in elevation and partially in section of an apparatus embodying the invention.

Referring now to the drawing for a more particular description, the invention is typified by the manufacture of a composition strip, block or the like, which is adapted to be employed in the constructional material art, especially for building and paving for surfacing and/or separating rigid elements.

Numeral 2 designates an extruder head or die, which is attached to an extrusion device, through which plastic material is adapted to be fed. A wedge or block 3, is fitted in the bore of the head to diverge the plastic material of rubber, asphalt or the like into two separate layers 4 and 5 which are applied to surface foundation sheets 6 and 7, such as saturated felt.

The foundation sheets are fed from supply rolls to a point near the extruder head to receive the plastic layers, after which the composite layers are each fed over a series of rolls 8, or other means, beneath a smoothing device 9, by which they are compressed. A suitable smoothing device is typified by a series of rolls 10, over which an endless conveyor 9ª may be circumvolved. Plates 11 may be advantageously positioned in the path of the foundation sheet to support it while being compressed by the smoothing device.

Subsequently the coated sheets may be superposed by additional forming means 12 and permanently adhered, or they may be only temporarily superposed, while the forming sheet is subdivided in lengths of suitable sizes. If they are to be permanently adhered a liquid element may be applied to the contacting surfaces of the felt sheets.

Though I have described with particularity of detail a certain embodiment of the invention, yet it is not to be understood therefrom that the invention is restricted to the particular embodiment disclosed. Various modifications may be made by those skilled in the art without departing from the spirit of the invention.

I claim:

1. A method for fabricating composition strips characterized by forming layers of plastic material, superposing each of the layers on a foundation sheet and then superposing the resulting composite strips.

2. A method for fabricating composition strips characterized by forming layers of plastic material, superposing each of the layers on a felt saturated sheet, and then superposing the resulting strips.

3. A method for fabricating composition strips characterized by forming layers of plastic material, superposing each of the layers on a foundation sheet, compressing the resulting strips, and then superposing them for being cut into suitable sizes.

4. Apparatus for fabricating composition strips comprising means for forming layers of plastic material, means for feeding a foundation layer in juxta-position with each of the plastic layers, means for compressing the individual composite layers, and means for superposing the composite layers.

5. Apparatus for fabricating composition strips comprising means for forming layers of plastic material, means for feeding a foundation layer in juxta-position with each of the plastic layers, a plate over which the juxtaposed layers are traversed, means for compressing said layers, and means for superposing the resulting structures.

6. A method for fabricating composition strips characterized by forming layers of plastic material, superposing each of the layers on a foundation sheet, superposing the resulting composition strips, and cutting the combined structure into suitable pieces.

7. A method for fabricating composition strips characterized by forming layers of plastic material, superposing each of the layers on a foundation sheet, interposing an adhesive means between the resulting composite strips, and then permanently attaching the resulting composite strips together.

8. A method for fabricating composition strips characterized by forming layers of plastic material, superposing each of the layers on a felt saturated sheet, superposing the resulting composite strips, and cutting the combined structure into suitable pieces.

9. A method for fabricating composition strips characterized by forming layers of plastic material, superposing each of the layers on a felt saturated sheet, interposing an adhesive means between the resulting composite strips, and then permanently attaching the resulting strips together.

10. A method for fabricating composition strips characterized by forming layers of plastic material superposing each of the layers on a foundation sheet, temporarily superposing the resulting composite strips, cutting the combined structure into suitable pieces, and separating the temporarily superposed composite strips.

11. A method for fabricating composition strips characterized by forming layers of plastic material, superposing each of the layers on a felt saturated sheet, temporarily superposing the resulting composite strips, cutting the combined structure into suitable pieces, and separating the temporarily superposed composite strips.

Signed at Chicago, in the county of Cook and State of Illinois, this 17th day of February 1930.

ALBERT C. FISCHER.